(12) United States Patent
Lin

(10) Patent No.: US 11,286,942 B2
(45) Date of Patent: Mar. 29, 2022

(54) FAN CONTROL SYSTEM

(71) Applicant: Kuo-Tsun Lin, Taichung (TW)

(72) Inventor: Kuo-Tsun Lin, Taichung (TW)

(73) Assignee: Kuo-Tsun Lin, Taichung (TW)

( * ) Notice: Subject to any disclaimer, the term of this patent is extended or adjusted under 35 U.S.C. 154(b) by 140 days.

(21) Appl. No.: 16/717,764

(22) Filed: Dec. 17, 2019

(65) Prior Publication Data

US 2021/0180604 A1 Jun. 17, 2021

(51) Int. Cl.
*F04D 27/00* (2006.01)
*H02P 6/08* (2016.01)

(52) U.S. Cl.
CPC .............. *F04D 27/004* (2013.01); *H02P 6/08* (2013.01)

(58) Field of Classification Search
CPC ................................. F04D 27/004; H02P 6/08
USPC ...................................................... 318/55–59
See application file for complete search history.

(56) References Cited

U.S. PATENT DOCUMENTS

| 7,489,094 | B2 * | 2/2009 | Steiner | H02P 1/24 318/245 |
| 9,998,041 | B1 * | 6/2018 | Woo | H02P 6/08 |
| 10,602,581 | B2 * | 3/2020 | Lin | H05B 47/16 |
| 10,602,582 | B2 * | 3/2020 | Lin | H05B 47/105 |
| 2004/0160792 | A1 * | 8/2004 | Youm | H02M 7/53873 363/37 |
| 2021/0126563 | A1 * | 4/2021 | Zhu | H02P 6/08 |

\* cited by examiner

*Primary Examiner* — Charles G Freay
(74) *Attorney, Agent, or Firm* — TraskBritt

(57) ABSTRACT

A fan control system includes an input unit receiving a domestic power signal, an operation controller, a first converter connected to the input unit and the operation controller, and a second converter connected to the first converter and a fan. Upon receipt of an operation signal outputted by the operation controller, the first converter switches from a normal mode where the domestic power signal is directly outputted as a converted power signal, to a converting mode where the domestic power signal having an attribute thereof varied for a preset duration is outputted as the converted power signal. The second converter outputs an output signal based on the converted power signal for controlling rotational speed of the fan.

5 Claims, 4 Drawing Sheets

FAN CONTROL SYSTEM

FIELD

The disclosure relates to a fan, and more particularly to a fan control system.

BACKGROUND

A conventional fan control system controls operation of a fan by transmitting a control signal to the fan via a control line, which is separate from a power line that carries electricity for driving operation of the fan.

In addition, for a conventional wireless control scheme where multiple controllers are configured to emit wireless signals to respectively control multiple fans, issues of interference between fan controls may arise if consideration is not made to distinguish the wireless signals having overlapping spectrum. For example, two or more fans may be unintendedly activated when only one controller is operated.

SUMMARY

Therefore, an object of the disclosure is to provide a fan control system that can alleviate at least one of the drawbacks of the prior art.

According to the disclosure, the fan control system is adapted to be electrically connected to a fan, and to control operation of the fan. The fan control includes an input unit, an operation controller, a first converter and a second converter.

The input unit is configured to receive a domestic power signal that is alternating current (AC) electricity. The operation controller is configured to be operated to output an operation signal. The first converter is electrically connected to the input unit and the operation controller. The first converter is configured to convert the domestic power signal into a converted power signal with reference to the operation signal. The first converter is switchable, in response to receipt of the operation signal, from a normal mode where the domestic power signal is directly outputted by the first converter as the converted power signal, to a converting mode where an attribute of the domestic power signal is varied for a preset duration and the domestic power signal having the attribute varied is outputted as the converted power signal. The first converter switches from the converting mode back to the normal mode after the preset duration has elapsed. The second converter is electrically connected to the first converter, and is adapted to be electrically connected to the fan. The second converter is configured to output an output signal based on the converted power signal for driving operation of the fan. The second converter determines whether the converted power signal has varied for the preset duration. The second converter is configured to adjust the output signal based on the converted power signal when it is determined that the converted power signal has varied for the preset duration so as to change rotational speed of the fan.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
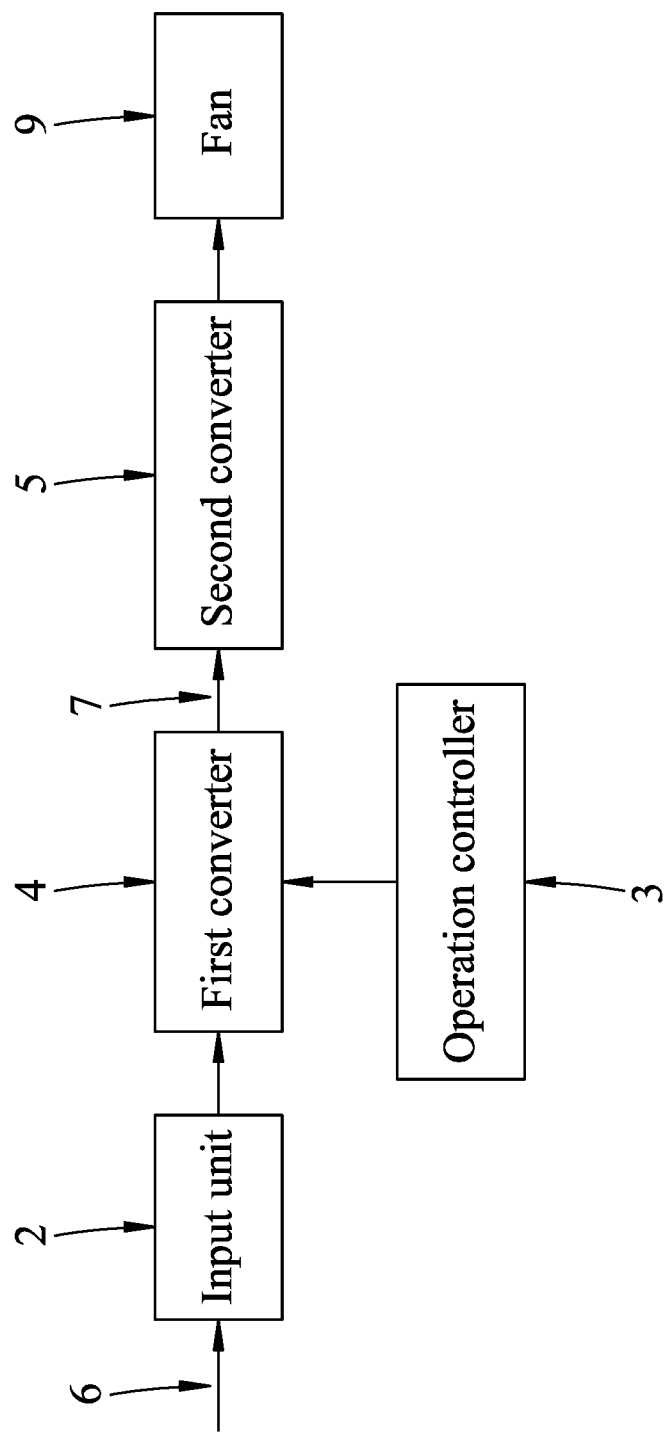
FIG. 1 is a block diagram illustrating an embodiment of a fan control system according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
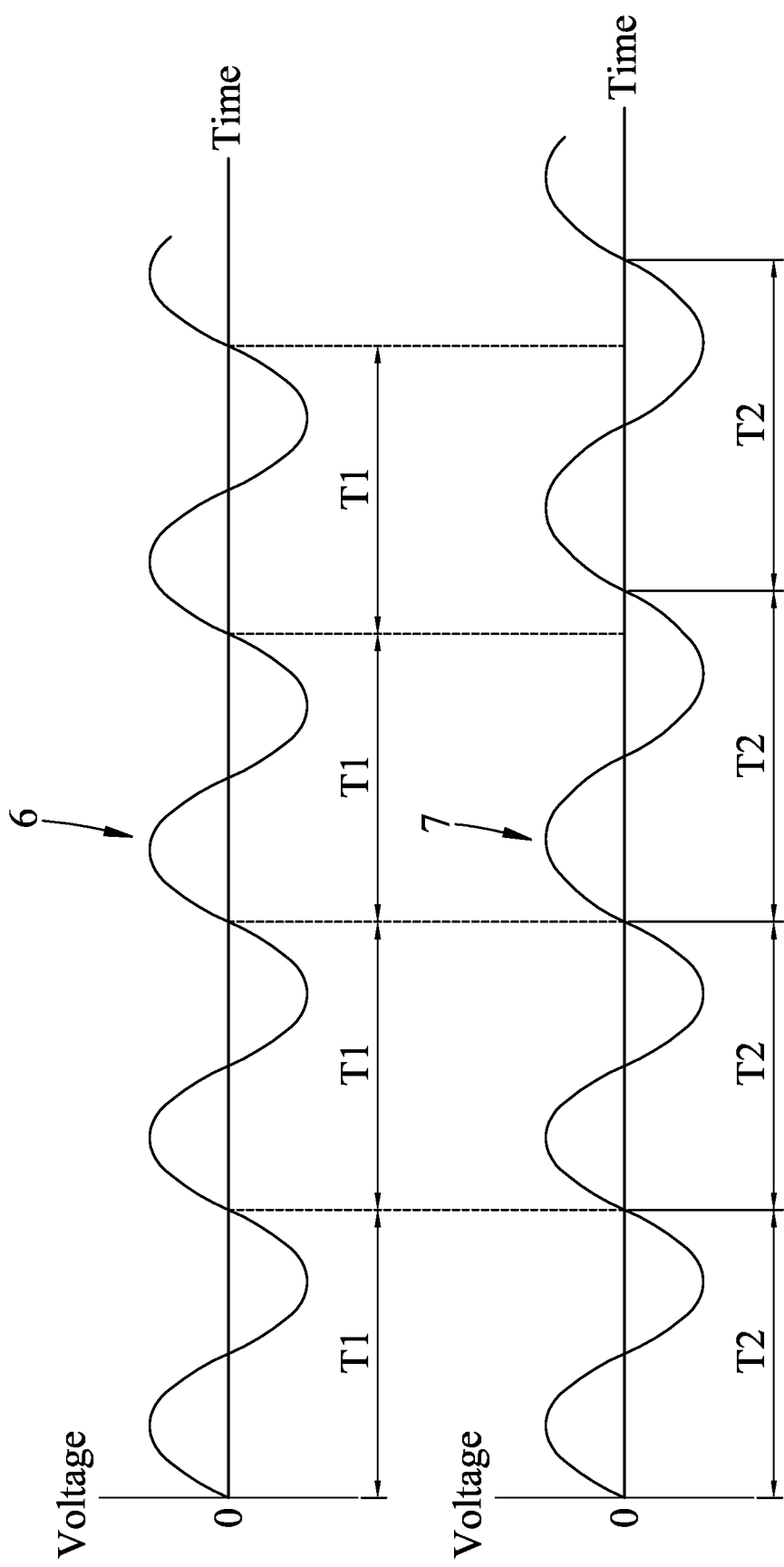
FIG. 2 is a graph illustrating an exemplary domestic power signal and an exemplary converted power signal of the fan control system according to one embodiment of the disclosure.

Referring to FIGS. 1 and 2, an embodiment of a fan control system according to the disclosure is illustrated. The fan control system is adapted to be electrically connected to a fan 9, and to control operation of the fan 9. In this embodiment, the fan 9 is a ceiling fan, but the type and the number of fan (s) to be controlled by the fan control system are not limited to the disclosure herein. The fan control system includes an input unit 2, an operation controller 3, a first converter 4 and a second converter 5.

The input unit 2 is configured to receive a domestic power signal 6. The domestic power signal 6 is alternating current (AC) electricity which is a periodic signal with a period of T1 as shown in FIG. 2. In this embodiment, the input unit 2 is implemented by a fuse, but may be an input terminal for receiving the domestic power signal 6 in other embodiments.

The operation controller 3 may be mounted on a wall, and is configured to be operated to output an operation signal to control operation (e.g., rotational speed) of the fan 9. The operation controller 3 may be a wired remote control, a push button switch, a slide switch, a rotary switch or the like, but is not limited to the disclosure herein and may vary in other embodiments. The operation signal may take different forms when the intended action is different. For example, the operation signal to increase the rotational speed of the fan 9 by one preset level may be different from the operation signal to increase the rotational speed of the fan 9 by two preset levels.

The first converter 4 is electrically connected to the input unit 2 and the operation controller 3. The first converter 4 is configured to convert the domestic power signal 6 into a converted power signal 7 with reference to the operation signal. The converted power signal 7 is a signal with a variable period of T2 as shown in FIG. 2. In this embodiment, each of the domestic power signal 6 and the converted power signal 7 is represented in a form of voltage, but may be represented in a form of electric current in other embodiments.

The first converter 4 is switchable between a normal mode and a converting mode. Specifically, in this embodiment, the first converter 4 is generally in the normal mode, and enters the converting mode when in receipt of the operation signal.

Referring to the first two cycles of each of the domestic power signal 6 and the converted power signal 7 in FIG. 2, the domestic power signal 6 is directly outputted by the first converter 4 as the converted power signal 7 when the first converter 4 is in the normal mode.

Referring to the next two cycles following the aforementioned first two cycles of each of the domestic power signal 6 and the converted power signal 7 in FIG. 2, when the first converter 4 is in the converting mode, an attribute of the domestic power signal 6 is varied for a preset duration and the domestic power signal 6 having the attribute varied is outputted as the converted power signal 7. The first converter 4 switches from the converting mode back to the normal mode after the preset duration has elapsed.

In this embodiment, when the first converter 4 is in the converting mode, the domestic power signal 6 and the converted power signal 7 are different in period, and thus, frequency (i.e., the period or frequency serves as the attribute), and a frequency of the converted power signal 7 is lower than a frequency of the domestic power signal 6, i.e., the period T1 of the domestic power signal 6 is shorter than the period T2 of the converted power signal 7 when the first converter 4 is in the converting mode. For example, the frequency of the domestic power signal 6 may be 50 Hz or 60 Hz depending on different regions and/or standards, and the frequency of the converted power signal 7 is lower than that of the domestic power signal 6 by, but not limited to, a frequency difference which ranges from 2 to 10 Hz. It is worth to note that, for each of the different forms of the operation signal, the period T2 of the converted power signal 7 is different. The preset duration ranges between 1 and 5 seconds, exemplarily. However, implementation of conversion performed by the first converter 4 on the domestic power signal 6 is not limited to the disclosure herein and may vary in other embodiments.

In one embodiment, when the first converter 4 is in the normal mode, the domestic power signal 6 and the converted power signal 7 are identical in frequency (i.e., the period T1 of the domestic power signal 6 is the same as the period T2 of the converted power signal 7) and also identical in waveform. When the first converter 4 is in the converting mode, the domestic power signal 6 and the converted power signal 7 are identical in frequency, but are different in waveform (i.e., waveform is the attribute). Specifically speaking, when in the converting mode, the first converter 4 sets, for each cycle of the domestic power signal 6, an amplitude of a portion of the domestic power signal 6 in the cycle to zero so as to result in the converted power signal 7.

Figure 3:
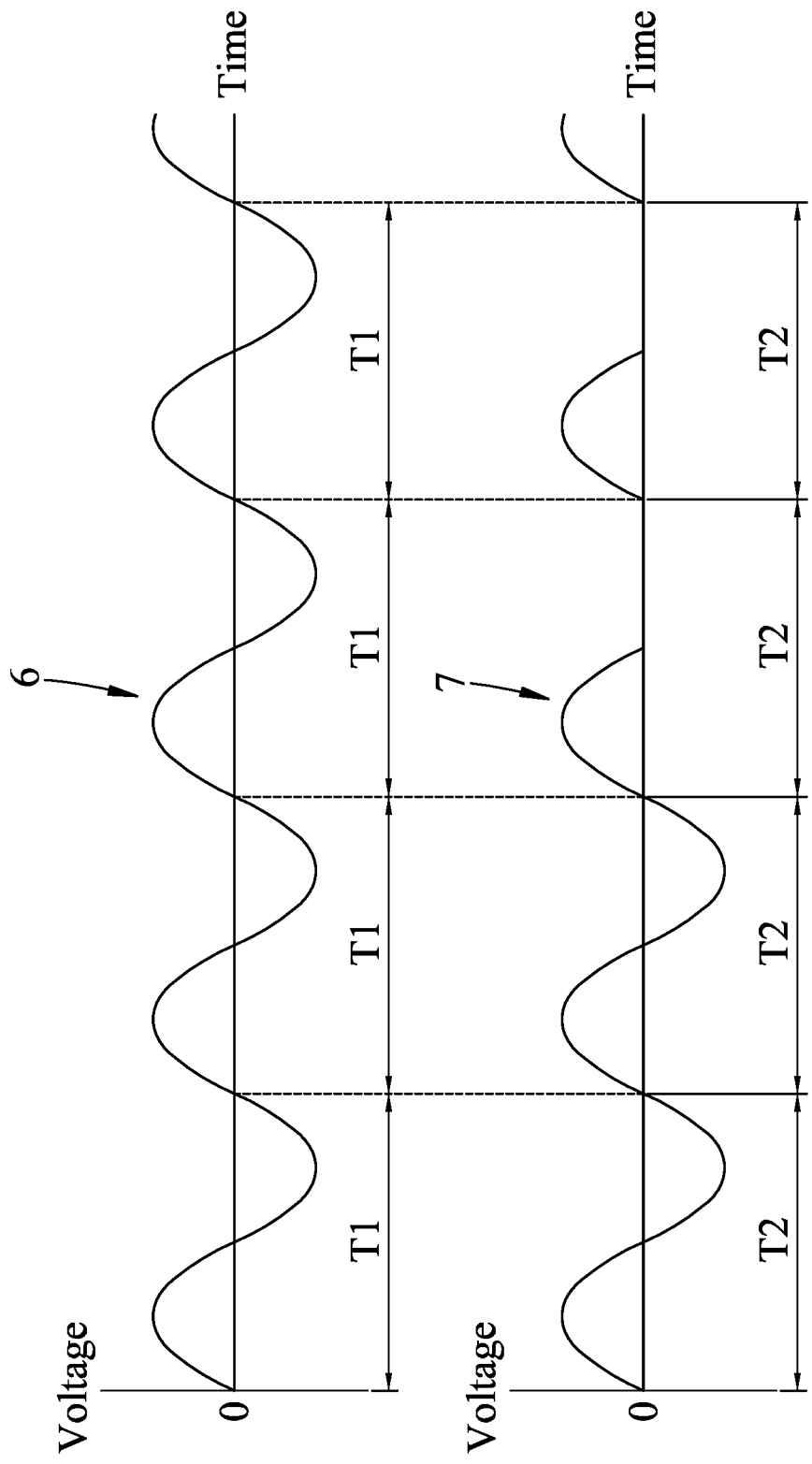
FIG. 3 is a graph illustrating an exemplary domestic power signal and an exemplary converted power signal of the fan control system according to another embodiment of the disclosure.

Referring to FIGS. 1 and 3, in another embodiment of the conversion to be performed by the first converter 4, for each of the third and fourth cycles of the domestic power signal 6, the first converter 4 sets the amplitude of a latter half of the domestic power signal 6 in the cycle to zero so as to obtain the converted power signal 7 (see the third and fourth cycles of the converted power signal 7 shown in FIG. 3).

Figure 4:
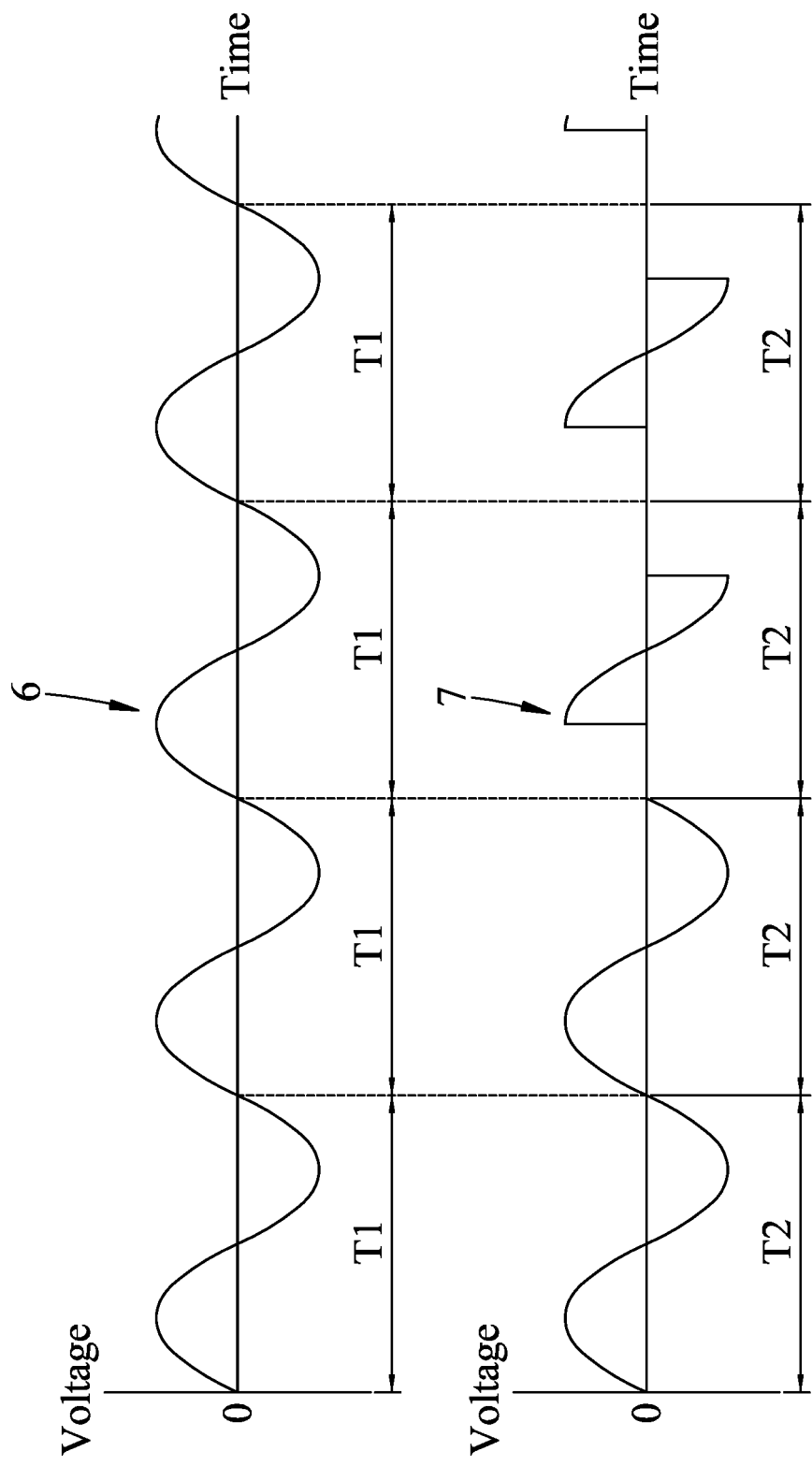
FIG. 4 is a graph illustrating an exemplary domestic power signal and an exemplary converted power signal of the fan control system according to het another embodiment of the disclosure.

Referring to FIGS. 1 and 4, in still another embodiment of the conversion to be performed by the first converter 4, for each of the third and fourth cycles of the domestic power signal 6, the first converter 4 sets the amplitude of a first quarter and a last quarter of the domestic power signal 6 in the cycle to zero so as to obtain the converted power signal 7 (see the third and fourth cycles of the converted power signal 7 shown in FIG. 4).

In one embodiment, when the first converter 4 is in the converting mode, for each of multiple equal duration segments in the preset duration, a first predetermined number of cycle(s) of the domestic power signal 6 is directly outputted by the first converter 4 as the converted power signal 7, and the amplitude of the domestic power signal 6 in the remaining cycle(s) of the domestic power signal 6 is set to zero and is outputted as the converted power signal. In a scenario where the frequency of the domestic power signal 6 is 60 Hz, i.e., the domestic power signal 6 has 60 cycles per second, for each second (namely the duration segment in this example) in the preset duration, the first converter 4 directly outputs the first 58 cycles of the domestic power signal 6 as the converted power signal 7, and sets the amplitude in the last two cycles of the domestic power signal 6 to zero to serve as the converted power signal 7.

Referring to FIG. 1, the second converter 5 is electrically connected to the first converter 4, and is adapted to be electrically connected to the fan 9. The second converter 5 is configured to output an output signal based on the converted power signal 7 for driving operation of the fan 9. The second converter 5 determines whether the received converted power signal has varied for the preset duration. The second converter 5 is configured to adjust the output signal based on the converted power signal 7 when it is determined that the converted power signal 7 has varied for the preset duration so as to change operation (e.g., rotational speed) of the fan 9.

Each of the first converter 4 and the second converter 5 may be implemented by any circuit configurable/programmable in a software manner and/or hardware manner to implement functionalities discussed in this disclosure.

In an example of use in connection with the embodiment of FIG. 2, to adjust an original rotational speed of the fan 9 to a desired rotational speed, a user operates the operation controller 3, and then the operation controller 3 outputs the operation signal to the first converter 4. In response to receipt of the operation signal, the first converter 4 switches to the converting mode to vary the domestic power signal 6 by adjusting the attribute, which is the frequency in this embodiment, of the domestic power signal 6 for the preset duration, and outputs the varied domestic power signal 6 as the converted power signal 7. The second converter 5, which originally outputs the output signal based on the converted power signal 7 for driving the fan 9 to rotate at the original rotational speed, determines whether the converted power signal 7 has varied for the preset duration. When it is determined that the waveform of the converted power signal 7 has varied for the preset duration, i.e., the first converter 4 is in the converting mode, the second converter 5 adjusts the output signal so the fan 9 is driven by the output signal to rotate at the desired rotational speed. Otherwise, when it is determined that the waveform of the converted power signal 7 has not varied, or has not varied for the preset duration, i.e., the first converter 4 is in the normal mode, the output signal outputted by the second converter 5 is unchanged so that the fan 9 is kept to rotate at the original rotational speed.

It should be noted that the fan control system according to the disclosure and the fan 9 are in a wired connection scheme instead of a wireless connection scheme, so issues of interference between different fan controls and limitation on control range which would arise in wireless control scheme are eliminated. Moreover, since the converted power signal 7 is only varied for the preset duration, which accounts for only a small portion of the whole duration of power supply to the fan 9, influence on the operation of the fan 9 may be negligible.

In summary, the fan control system of this disclosure converts the domestic power signal 6 into the converted power signal 7 by utilizing the first converter 4 that is switchable from the normal mode to the converting mode in response to receipt of the operation signal outputted by the operation controller 3, and is able to change the rotational speed of the fan 9 by utilizing the second converter 5 that determines in which one of the normal mode and the converting mode the first converter 4 operates based on the converted power signal 7. The fan control system according to the disclosure integrates a control line for controlling the fan 9 into a power line for supplying power to the fan 9, so no control line is required and hardware cost is reduced. Additionally, the fan control system according to the disclosure and the fan 9 are connected in a wired manner, so adverse effects of interference between different fan controls for multiple fans may be alleviated.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A fan control system adapted to be electrically connected to a fan, and adapted to control operation of the fan, said fan control system comprising:
    an input unit configured to receive a domestic power signal that is alternating current (AC) electricity;
    an operation controller configured to be operated to output an operation signal;
    a first converter electrically connected to said input unit and said operation controller, and configured to convert the domestic power signal into a converted power signal with reference to the operation signal, said first converter being switchable, in response to receipt of the operation signal, from a normal mode where the first converter is configured to output the domestic power signal directly as the converted power signal, to a converting mode where the first converter is configured to vary an attribute of the domestic power signal for a preset duration and to output the domestic power signal having the attribute varied as the converted power signal, said first converter configured to switch from the converting mode back to the normal mode after the preset duration has elapsed; and
    a second converter electrically connected to said first converter and adapted to be electrically connected to the fan, said second converter configured to output an output signal based on the converted power signal, the output signal being adapted to be applied to the fan for driving operation of the fan, said second converter configured to determine whether the converted power signal has varied for the preset duration, and to adjust the output signal based on the converted power signal when it is determined that the converted power signal has varied for the preset duration.

2. The fan control system as claimed in claim 1, wherein:
    when said first converter is in the normal mode, the domestic power signal and the converted power signal are identical in frequency and in waveform; and
    when said first converter is in the converting mode, the domestic power signal and the converted power signal are different in frequency.

3. The fan control system as claimed in claim 2, wherein when said first converter is in the converting mode, a frequency of the converted power signal is lower than a frequency of the domestic power signal.

4. The fan control system as claimed in claim 1, wherein:
    when said first converter is in the normal mode, the domestic power signal and the converted power signal are identical in frequency and in waveform; and
    when said first converter is in the converting mode, the domestic power signal and the converted power signal are identical in frequency, but are different in waveform.

5. The fan control system as claimed in claim 4, wherein when said first converter is in the converting mode, said first converter sets, for each cycle of the domestic power signal, an amplitude of a portion of the domestic power signal in the cycle to zero, so as to result in the converted power signal.

* * * * *